(12) United States Patent
Lauridsen (10) Patent No.: US 8,740,186 B2
(45) Date of Patent: Jun. 3, 2014

(54) VALVE AND A METHOD FOR PROVIDING SUCH A VALVE

(75) Inventor: Christian Lauridsen, Limhamn (SE)

(73) Assignee: Nihab Nordisk Industrihydraulik AB, Arlov (SE)

( * ) Notice: Subject to any disclaimer, the term of this patent is extended or adjusted under 35 U.S.C. 154(b) by 80 days.

(21) Appl. No.: 13/144,585

(22) PCT Filed: Jan. 15, 2010

(86) PCT No.: PCT/EP2010/050432
§ 371 (c)(1),
(2), (4) Date: Aug. 22, 2011

(87) PCT Pub. No.: WO2010/081864
PCT Pub. Date: Jul. 22, 2010

(65) Prior Publication Data
US 2012/0119124 A1 May 17, 2012

Related U.S. Application Data

(60) Provisional application No. 61/145,031, filed on Jan. 15, 2009.

(30) Foreign Application Priority Data

Jan. 15, 2009 (SE) ........................................ 0950010

(51) Int. Cl.
*F16K 5/08* (2006.01)
(52) U.S. Cl.
USPC .......................................... 251/208; 251/314

(58) Field of Classification Search
USPC ................. 251/208–209, 304, 309–312, 314, 251/316–317.01
See application file for complete search history.

(56) References Cited

U.S. PATENT DOCUMENTS

| | | | |
|---|---|---|---|
| 3,066,909 A * | 12/1962 | Reed, Jr. ........................ | 251/309 |
| 3,383,088 A | 5/1968 | Duffey | |
| 3,554,488 A * | 1/1971 | Alexander ..................... | 251/317 |
| 3,589,679 A * | 6/1971 | Birk .............................. | 251/317 |
| 3,916,943 A * | 11/1975 | Hester et al. .................. | 137/375 |
| 4,156,438 A * | 5/1979 | Kiesow ..................... | 137/625.41 |
| 4,431,021 A | 2/1984 | Scaramucci | |
| 4,501,286 A * | 2/1985 | Rohlfing et al. ........... | 137/15.06 |
| 4,773,565 A * | 9/1988 | Rohlfing et al. .............. | 137/240 |
| 5,009,393 A * | 4/1991 | Massey ......................... | 251/207 |
| 5,108,075 A * | 4/1992 | Downard et al. ............. | 251/209 |
| 7,182,063 B2 * | 2/2007 | Keefover et al. .............. | 123/337 |
| 2007/0240690 A1 * | 10/2007 | Nanba ..................... | 123/568.18 |

FOREIGN PATENT DOCUMENTS

| | | |
|---|---|---|
| CN | 2407195 | 11/2000 |
| GB | 536536 | 5/1941 |

* cited by examiner

*Primary Examiner* — John Bastianelli
(74) *Attorney, Agent, or Firm* — Lowe Graham Jones PLLC (57) ABSTRACT

A valve comprises a valve body having a cylindrical bore and at least two fluid passages connected to the cylindrical bore. A rotating body has at least one means for allowing fluid flowing through the fluid passages, and at least one means for blocking fluid flowing through the fluid passages. At least one sealing is arranged inside said cylindrical bore, said sealing having an outer surface parallel with the axis of the cylindrical bore, and an inner surface parallel with the lateral surface of the rotating body. The rotating body comprises a frusto-conical shape.

12 Claims, 7 Drawing Sheets

VALVE AND A METHOD FOR PROVIDING SUCH A VALVE

PRIORTY CLAIM

This application is a national phase entry of PCT/EP2010/0501432 filed Jan. 15, 2010, which claims priority to U.S. Provisional Application 61/145,031 filed Jan. 15, 2009 and Swedish Application Serial No. 0950010-9 filed Jan. 15, 2009, the contents of which are hereby incorporated by reference.

TECHNICAL FIELD

The present invention relates to a valve comprising a valve body, a rotating body, and at least one sealing arranged inside said valve body. Further, the present invention relates to a method for manufacturing such a valve.

BACKGROUND

Valves are commonly used in hydraulic applications. In general terms, the valve is configured to regulate fluid flow by opening or closing fluid passages. Commonly used types are e.g. ball valves, plug valves, and gate valves. U.S. Pat. No. 3,383,088 discloses a plug valve having a conical shaped plug inserted in a conical bore. The space between the inner wall of the bore and the outer surface of the rotating body is sealed by means of a sleeve. Further, pressure relief areas are provided to prevent a pressure build-up forcing the sleeve into a port of the plug. One drawback with the above-mentioned valve is that the manufacturing requires complex and advanced machinery. Another drawback is that the plug is allowed to move in an axial direction during operation, reducing the reliability of the valve. A yet further drawback with the valve is that it may not be implemented in hydraulic applications utilizing an internal pressure above 400 bars. In such case, hydraulic fluid may leak behind the sleeve and completely eliminate the function of the pressure relief areas.

For hydraulic applications, the DN-series of cartridge ball valves are commercially available by Rótelmann GmbH. These valves are configured to be connected to control manifold blocks in a simple way. Such a valve comprises a cartridge for insertion in a prepared well in the control block. The bore, which intersects the cartridge well at right angles, is blocked by means of a ball valve enclosed within the cartridge. An o-ring helically attached to the cartridge seals the cartridge-bore interface.

One disadvantage with the DN-series of valves is that the o-ring must pass over the openings of the cartridge when the valve is mounted. Hence, there is a severe risk of tearing the o-ring during mounting. Further, the valves comprise a plurality of components, leading to a complex and expensive valve.

Hence, there is a need for an improved valve, being efficient and cost-effective.

SUMMARY

Accordingly, the present invention seeks to mitigate, alleviate or eliminate one or more of the above-identified deficiencies in the art and disadvantages singly or in any combination and solves at least the above-mentioned problems by providing a device and a method according to the appended claims.

An object of the present invention is to provide a valve requiring less tolerance during manufacturing.

A further object of the present invention is to provide an improved valve for use in hydraulic systems, providing more design freedom and space reduction.

An idea according to some embodiments of the invention is to provide a valve for a hydraulic system, in which a user without the need of dismounting the valve or the system may control the internal pressure between a bore and a sealing. A further idea according to some embodiments is to provide a valve, allowing for elimination of sharp conduit turns in the control block and thus reducing turbulent fluid flow in said conduits.

Moreover, an idea according to some embodiments is to provide an improved valve, which is suitable for use in filter housings, manifold control blocks, and as a directional valve. According to a first aspect of the invention, a valve is provided. The valve comprises at least one sealing arranged inside a cylindrical bore, said sealing having an outer surface parallel with the axis of the cylindrical bore, and an inner surface parallel with a lateral surface of a rotating body, wherein the rotating body comprises a frusto-conical shape. The sealing may comprise at least two openings, each of which being aligned with one of the at least two fluid passages of the valve body. This is advantageous in that the sealing is provided around the two fluid passages, hence providing an efficient sealing.

The sealing may comprise at least two protrusive portions arranged adjacent to said openings, said protrusive portions are facing the interior surface of said cylindrical bore. This is advantageous in that an increased sealing is provided at an area adjacent to the two fluid passages.

The sealing may comprise at least two recessive portions arranged at a distance from said openings, said recessive portions are facing the lateral surface of said rotating body. This is advantageous in that a decreased sealing is provided at areas facing the lateral surface of the rotating body, thus reducing the friction of the rotating body for facilitating operation of the valve.

The valve body may comprise a recess and said sealing may comprise a lip received by said recess for preventing the sealing from rotating. At least one means for receiving fluid flowing through the fluid passages of the rotating body may comprise a through hole.

At least one means for receiving fluid flowing through the fluid passages of the rotating body may comprise at least one notch.

The rotating body may comprise a solenoid. The valve may further comprise a fitting integrally formed with the valve body, said fitting having at least two fluid conduits, each of which being connected to one of the at least two fluid passages of the valve body, and a threaded countersink connected to the cylindrical bore in which the rotating body is free to rotate, and a threaded nut comprising a through hole for receiving said rotating body, said threaded nut being engageable with said threaded countersink According to a second aspect of the invention, a method for providing a valve is provided. The method comprises the steps of providing a valve body having a cylindrical bore and at least two fluid passages connected to the cylindrical bore, arranging a threaded countersink connected to the cylindrical bore, arranging at least one sealing inside said cylindrical bore, said sealing having an outer surface parallel with the axis of the cylindrical bore, and a tapered inner surface, providing a rotating body inside said cylindrical bore, the lateral surface of the rotating body having a frusto-conical shape corresponding to the inner surface of the sealing, said rotating body having at least one means for receiving fluid flowing through the fluid passages, at least one means for blocking fluid flowing through the fluid passages, and a stem extending outside said valve body for operating said valve, and sealing said fluid system by means of a threaded nut engageable with said threaded countersink, said nut comprising a through hole for receiving said stem, wherein the rotating body is pressed downwards when the nut is tightened.

BRIEF DESCRIPTION OF THE DRAWINGS

These and other aspects, features and advantages of which the invention is capable of will be apparent and elucidated from the following description of embodiments of the present invention, reference being made to the accompanying drawings, wherein.

DETAILED DESCRIPTION

As used in this description the expressions "upper", "lower" and similar expressions are in relation to the valve as shown in the Figs, referred to. A person skilled in the art realizes that in use the valve may have any orientation. As used in this description the expressions "lateral", "radial", "axial" and similar expressions are in relation to the different parts referred to.

Figure 1:
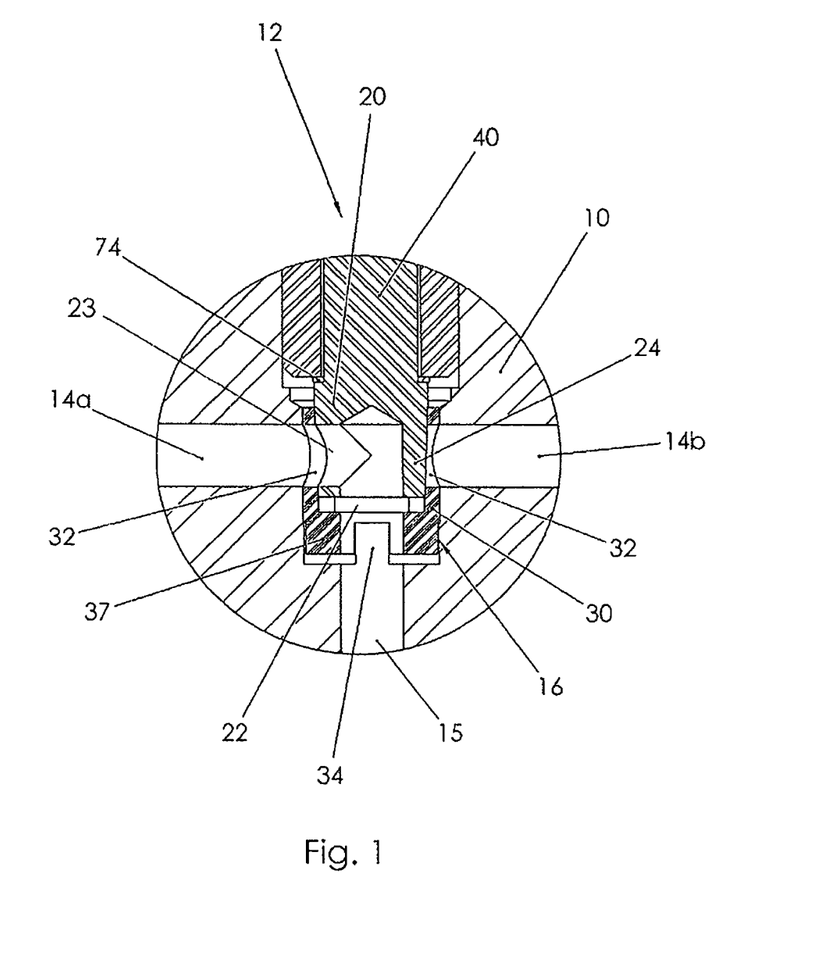
FIG. 1 is a cross sectional view of a part of a valve according to the present invention.
Figure 2:
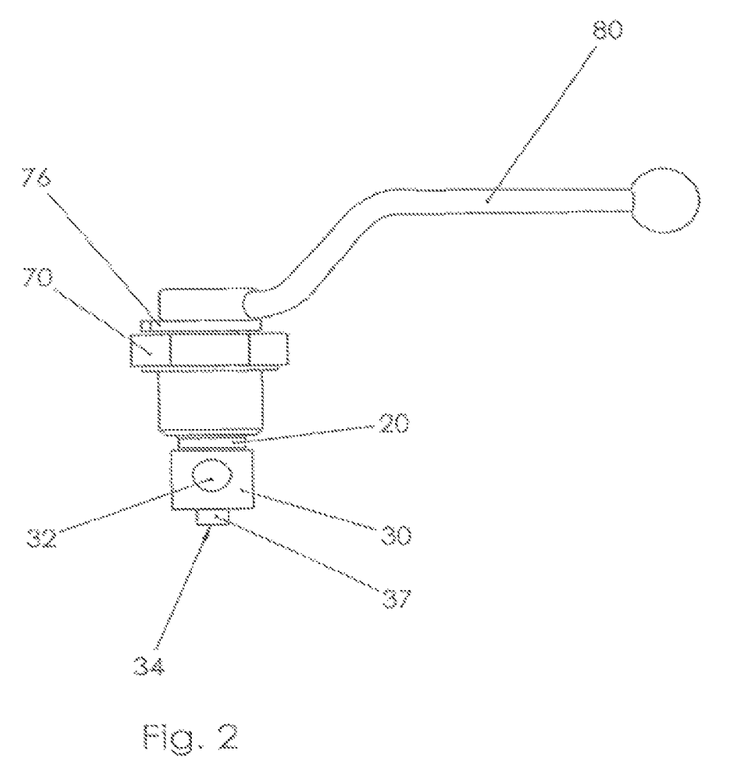
FIG. 2 is a side view of a valve member according to one embodiment.
Figures 5A, 5B, 5C:
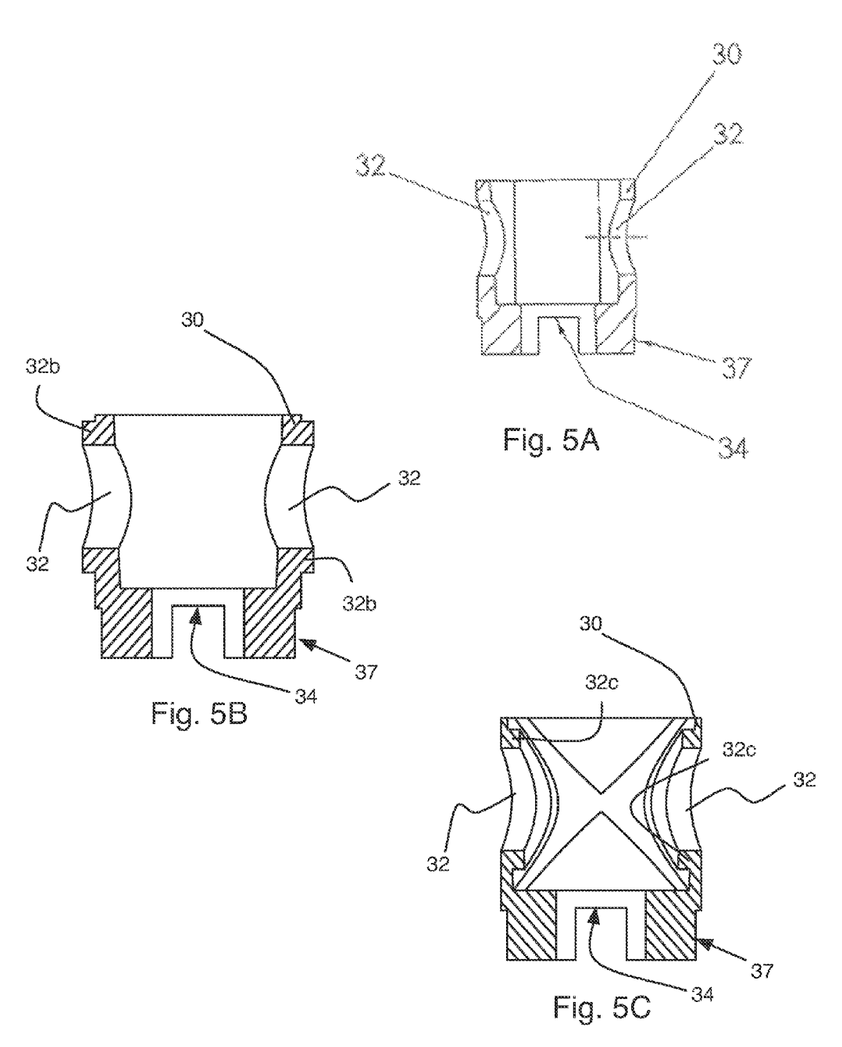
FIG. 5A through 5C are cross-sectional views of embodiments of a sealing.
Figure 6:
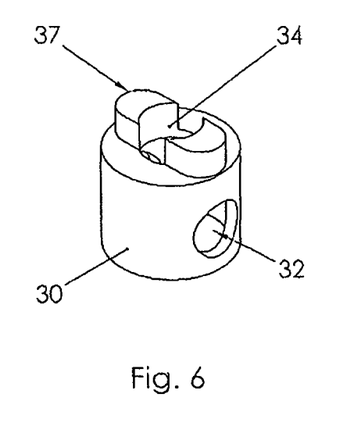
FIG. 6 is a perspective view of the sealing shown in FIG. 5A.

With reference to FIG. 1, a valve comprises a valve body 10 having a cylindrical bore 12 and three fluid passages 14a, 14b, 15 connected to the cylindrical bore 12. Two of the fluid passages 14a, 14b are arranged at right angles to the cylindrical bore 12, while the third fluid passage 15 is arranged in line with the cylindrical bore 12. A rotating body 20 is arranged within the cylindrical bore 12. The rotating body has means 22 for receiving fluid flowing through the fluid passages 14a, 14b, 15, and means 24 for blocking fluid flowing through the fluid passages 14a, 14b, 15. Different embodiments of the means allowing and blocking flow, respectively, will be described in more detail below. Further, a stem 40 is connected to the rotating body 20 and extends outside the valve body 10 for operating the valve (not shown). The stem 40 is normally an integrated part of the rotating body 20, but in some embodiments a stem is fixed to the rotating body by means of welding for example. The valve further comprises at least one sealing 30 arranged inside said cylindrical bore 12 in the area of the fluid passages 14a, 14b, 15, for sealing the space between the cylindrical bore 12 and the rotating body 20. In the shown embodiment the sealing 30 extends below the extent of the rotating body 20. The sealing 30 has an outer surface parallel with the axis of the cylindrical bore 12, and an inner surface parallel with the outer lateral surface of the rotating body 20. The rotating body 20 comprises a frusto-conical shape. Thus, both the outer lateral surface of the rotating body 20 and the inner lateral surface of the sealing 30 inclines somewhat. The inclination is normally in the interval 1°-30° and preferably in the interval 2°-10°. A valve member to be inserted in the valve body 10 is shown in FIG. 2. The valve member comprises a rotating body 20, connected to a stem 40. The rotating body 20 has a frusto-conical shape, corresponding to the interior surface of the sealing 30. The sealing 30 encloses the complete rotating body 20, and comprises three openings 32, 34 through which hydraulic fluid may flow. The outer surface of the sealing 30 is cylindrically shaped in order to be received in the cylindrical bore 12 of the valve body 10. The stem 40 extends through a threaded nut 70, and a handle 80 is provided at the end of the stem 40 for manually rotating the valve body 20 relative the threaded nut 70. A brick 76 is provided for limiting the rotation of the handle 80 and, thus, the rotating body 20 between two positions, one position allowing flow and one position blocking flow. The sealing 30, as shown in FIGS. 5A and 6, is forming a cylindrical body, having a tapered inner surface corresponding to the frusto-conical shape of the rotating body. The lateral surface of the sealing 30 comprises two openings 32 through which fluid may flow. The openings 32 are arranged on opposite sides of the sealing 30, i.e. 180° apart. Furthermore, the sealing 30 has an opening 34 at the bottom of the rotating body 20, through which opening 34 fluid may flow. The sealing 30 comprises a non-circular lip 37 at the bottom part of the sealing 30. The lip 37 is to be received in a recess 16 at the bottom of the cylindrical bore 12 of the valve body 10. The lip 37 of the sealing 30 and the recess 16 of the cylindrical bore 12 are formed in such away that the sealing 30 will not rotate within the cylindrical bore 12. In one embodiment the recess 16 and the lip 37 are given mutually corresponding forms, whereby the lip 37 is held firmly within the recess 16.

Figure 3:
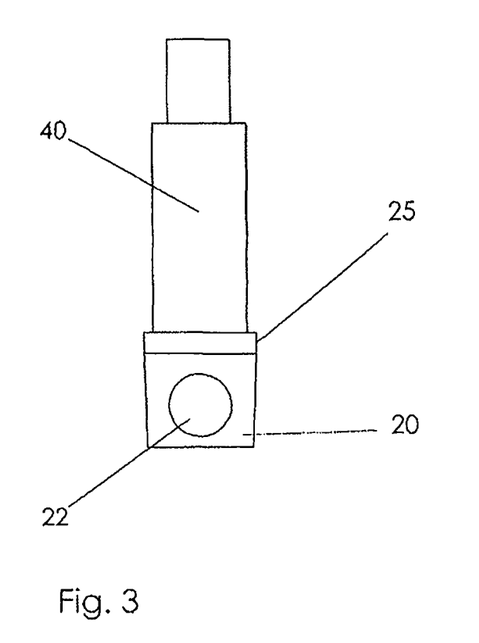
FIG. 3 is a side view of a rotating body according to a first embodiment.
Figure 4:
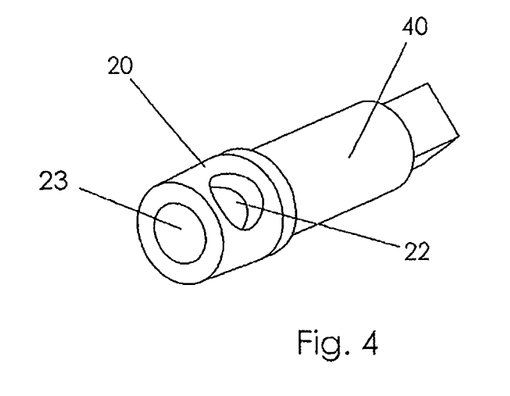
FIG. 4 is a perspective view of the rotating body shown in FIG. 3.

One example of a rotating body 20 and the stem is shown in FIGS. 3 and 4. The rotating body 20 enclosed by the sealing 30 is forming a fluid conduit between one opening 22 arranged on the lateral surface of the rotating body 20 and a through opening 23 arranged on the bottom of the rotating body 20. By rotating the rotating body 20 in relation to the sealing 30 the opening 22 on the lateral surface of the rotating body 20 may be brought into and out of alignment, respectively, with the openings 32 of the lateral surface of the sealing 30. The opening 34 at the bottom of the sealing 30 is aligned with the opening 23 arranged on the bottom of the rotating body 20. During operation of the valve, fluid is allowed to flow through the valve when the opening 22 arranged on the lateral surface of the rotating body 20 is aligned with any one of the openings 32 of the sealing 30. The rotating body 20 is rotatable by means of the handle 80, or any other means connected to the rotating body 20 for operating the valve. Fluid is prevented from flowing through the valve when the opening 22 arranged on the lateral surface of the rotating body 20 is not aligned with any one of the openings 32 on the lateral surface of the sealing 30. This is achieved by rotating the body 20 approximately 90°. Hence, the fluid flow is blocked by the wall 24 forming the lateral surface of the rotating body 20 in the area opposite the lateral opening 22. As indicated above, during rotation of the rotating body 20, the sealing 30 is prevented from rotating by means of the lip 37, fixedly received by the recess 16 of the valve body 10.

The rotating body 20 is integrally formed with the stem 40. In other embodiments the stem is fixed to the rotating body by welding for instance. The axis of the rotating body 20 coincides with the axis of the stem 40, in order to avoid any lateral forces during rotation. The rotating body 20 has a frusto-conical shape, and is connected to the stem 40 by means of a cylindrical portion 25. The stem 40 further comprises a top portion having a cuboid form, for receiving a handle 80 or any other means for operating the valve. Further, the rotating body 20 is forming a fluid conduit between the opening 22 arranged on the lateral surface of the rotating body 20 and an opening 23 arranged at the bottom of the rotating body 20.

Figures 7, 8:
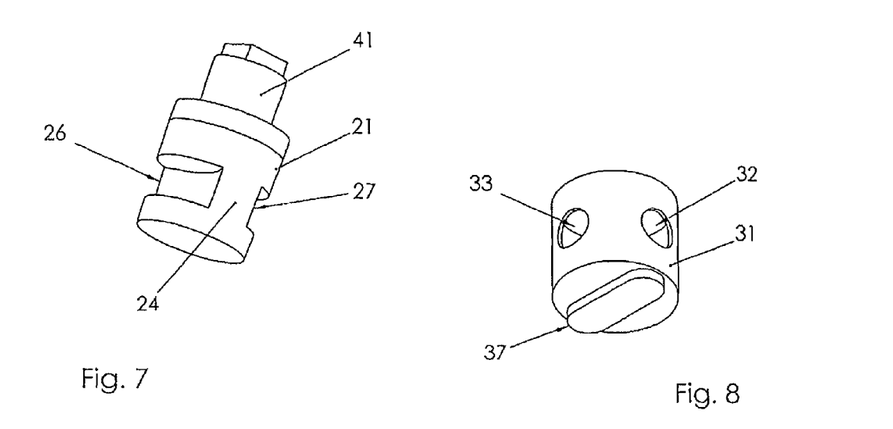
FIG. 7 is a perspective view of a rotating body according to a further embodiment.
FIG. 8 is a perspective view of a sealing according to a further embodiment.

In FIG. 7, an alternative embodiment of the valve member comprising a rotating body 21 and a stem 41 is shown. The rotating body 21 comprises a frusto-conical shape, according to what has previously been described. Instead of the fluid channel extending between an opening in the lateral surface of the rotating body 21 and an opening arranged on the base surface of the rotating body 21, the rotating body 21 comprises two notches 26, 27 which are arranged on opposite sides of the rotating body 21. The notches are arranged between an upper and a lower end of the rotating body 21, forming two recessed portions through which fluid may flow.

Figure 9:
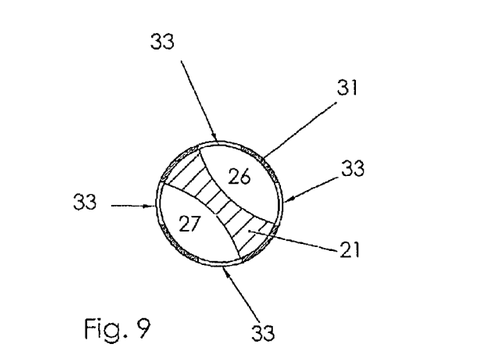
FIG. 9 is a cross-sectional view of the sealing and the rotating body shown in FIGS. 7 and 8.
Figure 10:
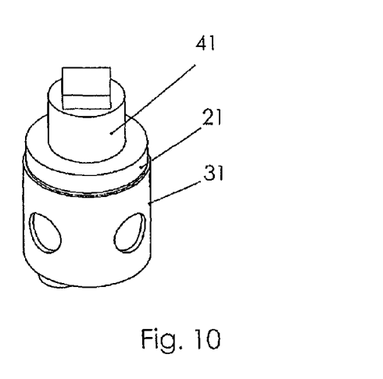
FIG. 10 is a perspective view of the sealing and the rotating body shown in FIGS. 7 and 8.

The valve member shown in FIG. 7 may be used with a sealing 31 as shown in FIG. 8. The sealing 31 comprises a cylindrical hollow body, having a tapered inner surface corresponding to the frusto-conical shape of the rotating body 21. The sealing 31 comprises four openings 33, arranged on the lateral surface of the sealing 31, and spaced apart by 90°. A non-circular lip 38 is to co-operate with a recess of a cylindrical bore in correspondence with the above description in order to hinder the sealing 31 from rotating inside the cylindrical bore. Further, in this embodiment there are no openings in the bottom of the rotating body 21 or the sealing 31, respectively. Thus, no fluid flow is allowed through the bottoms of the rotating body 21 and sealing 31, respectively. FIGS. 9 and 10 show the valve member shown in FIG. 7 and the sealing shown in FIG. 8, when the rotating body 21 is received by the sealing 31. Also in this embodiment the lateral contact surface between the rotating body 21 and the sealing 31 have a small inclination of about 2°. The inclination should be in the interval 1°-30° and preferably in the interval 2°-10°. The operation of the valve is provided by a rotation of the rotating body 21 relative the sealing 31. When the valve is open, the openings 33 of the sealing 31 are arranged adjacent to the notches 26, 27 of the rotating body 21. Hence, fluid may flow through a fluid conduit connected to one opening 33, enter the sealing 31, and be guided by means of the notches 26, 27 to another opening 33 connected to a second fluid conduit. This position of the rotating body 21 is shown in FIG. 9.

When the valve is closed, by rotating the rotating body 21 by 45° in relation to the position shown in FIG. 9, the notches 26, 27 are connected to only one fluid conduit each, preventing fluid flow through the rotating body 21.

Figure 11:
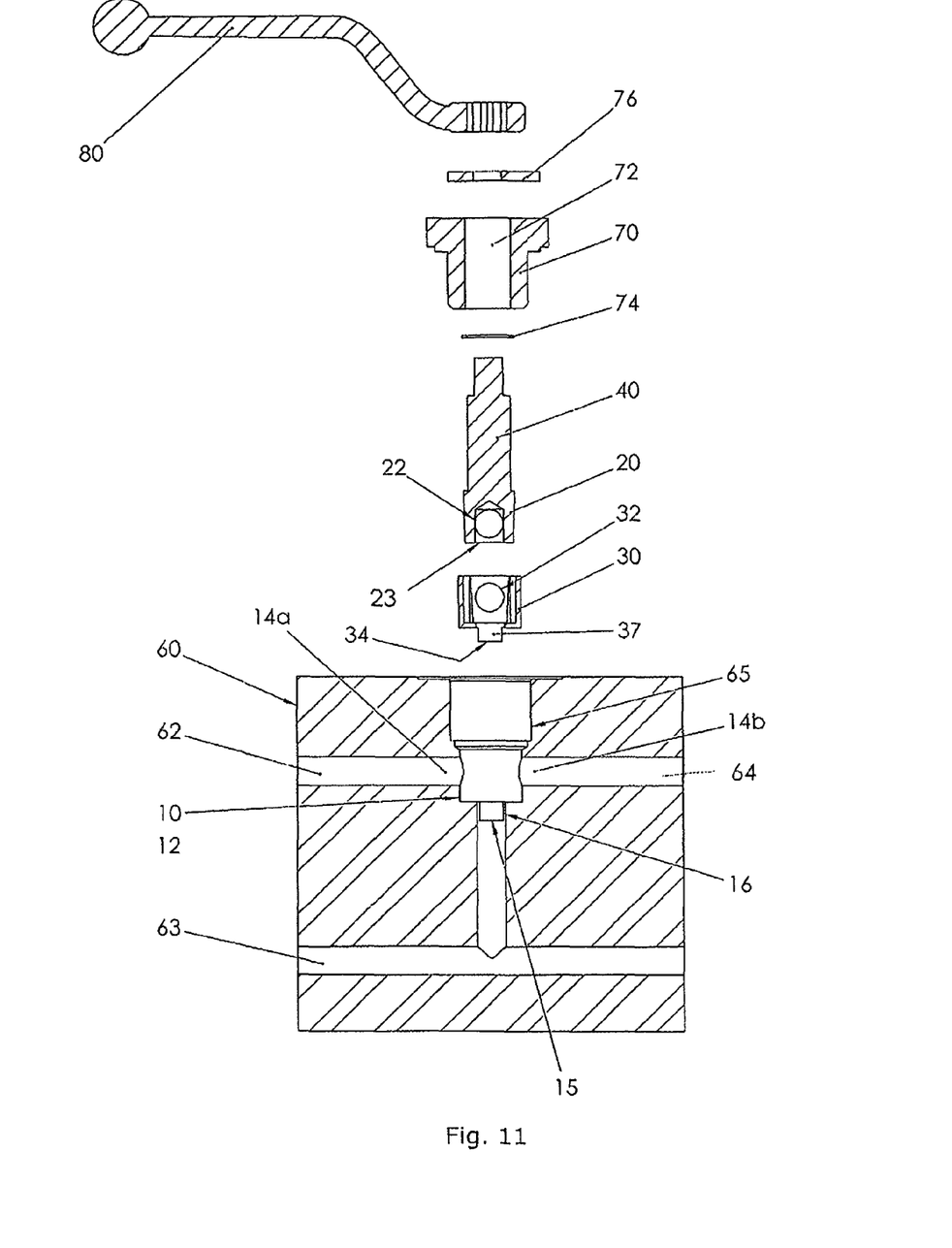
FIG. 11 is an exploded view in cross-section of a valve comprising the valve parts of FIG. 1.

In a further embodiment, any number of notches and openings may be provided, for enabling connection with a number of fluid conduits equalling the number of openings. For example, the rotating body may comprise three notches, spaced apart by the lateral surface of the rotating body, and arranged by a distance of 120°. Correspondingly, the sealing will have six openings, arranged on the lateral surface of the sealing, and spaced apart by 60°. With reference to FIG. 11, a valve is shown, which valve comprises the valve parts of FIG. 1. The fluid system comprises a fitting 60, having three fluid conduits 62, 63, 64 connected to the cylindrical bore 12 of the valve body 10 integrally formed with the fitting 60. The three fluid passages 14a, 14b, 15 of the valve body 10 are connected to the fluid conduits 62, 63, 64. Further, a threaded countersink 65 is connected to the cylindrical bore 12.

The fluid flow within the conduits 62, 63, 64 is controlled by means of the valve, provided in the fitting 60. The valve comprises the valve body 10, the rotating body 20, and the sealing 30. The sealing 30 is arranged within the cylindrical bore 12, and has a tapered inner surface. Further, the sealing 30 comprises three openings 32, 34 aligned with the fluid passages 14a, 14b, 15 of the valve body 10. The sealing 30 is fixedly attached within the cylindrical bore 12 by means of the lip 37, received in the recess 16 of the cylindrical bore 12.

The rotating body 20 has a frusto-conical shape, corresponding to the tapered inner surface of the sealing 30. Further, the rotating body 20 is provided with two openings 22, 23, of which one opening 22 is arranged on the lateral surface, and one opening 23 is arranged on the base surface. The rotating body 20 is rotatably arranged within the sealing 30. Further, the opening 23 of the rotating body 20, the opening 34 of the sealing 30, and the fluid passage 15 are centrally aligned.

The valve further comprises the stem 40, integrally formed with the rotating body 20. The stem 40 extends through a threaded nut 70 comprising a through hole 72 for receiving said stem. The threaded nut 70 is engageable with the threaded countersink 65. A handle 80 is arranged at the upper end of the stem 40 to manually operate the valve. The handle 80 may be a manually operating grip. In an embodiment, the stem 40 comprises a magnetic core enclosed within the stem. Consequently, an electromagnetic control device, for rotating the rotating body 20 connected to the stem 40, may replace the handle 80. This is advantageous in that the valve may be used as a directional valve, automatically controlled by means of the control device. A sealing 74 is provided to seal the interface between the threaded nut 70 and the rotating body 20.

During mounting of the valve, the rotating body 20 is pressed downwards when the nut 70 is tightened. Hence, the sealing 30 is compressed between the rotating body 20 and the cylindrical bore 12 when the rotating body 20 is pressed downwards.

The sealing 30 may have a circumferential thickness distribution, for facilitating rotational movement of the rotating body 20. In one embodiment, the sealing 30 comprises protrusive areas 32b arranged adjacent to the openings 32, facing the cylindrical bore 12 as Shown in FIG. 5B. In a further embodiment, the sealing 30 comprises a recessive area facing the lateral surface of the rotating body 20. The recessive area may comprise the complete inner surface of the sealing 30, except the area 32 *c* adjacent to the openings 32 as shown I FIG. 5C. Thus, in both these embodiments the sealing 30 is thicker at said openings 32, whereby the sealing 30 is held firmly at the openings.

In still a further embodiment, the sealing 30 comprises two symmetrical portions, each of which having an opening 32 aligned with a fluid passage 14a, 14b. Each symmetrical portion has a limited lateral extension, allowing a space between the rotating body 20 and the cylindrical bore 12 at areas provided between the openings 32. It will be appreciated that the embodiments described in the foregoing may be combined without departing from the scope as defined by the appended claims.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A hydraulic directional valve, comprising
a valve body having a cylindrical bore defining at least three openings, and at least three fluid passages each fluid passage extending from outside the valve body to an opening of the at least three openings and providing a fluid flow path between the cylindrical bore and outside the valve body,
a rotating body defining a portion effective, at one or more first rotational positions of the rotating body, to define a fluid path between any adjacent pair of openings of the at least three openings, the fluid path not in fluid communication with other openings of the at least three openings, the portion further effective, at one or more second rotational positions of the rotating body, to fluidically isolate the at least three openings from one another,
at least one sealing arranged inside said cylindrical bore, said sealing having an outer lateral surface parallel with the axis of the cylindrical bore, and an inner lateral surface parallel with the lateral surface of the rotating body, wherein the rotating body comprises a frusto-conical shape.

2. The hydraulic directional valve according to claim 1, wherein a contact surface between the inner lateral surface of the sealing and a lateral outer surface of the rotating body have an inclination in the interval 1°-30°.

3. The hydraulic directional valve according to claim 1, wherein said sealing comprises at least three openings, each of which being aligned with one of the at least three fluid passages of the valve body.

4. The hydraulic directional valve according to claim 3, wherein said sealing comprises at least three protrusive portions arranged adjacent to said openings, said protrusive portions are facing the interior surface of said cylindrical bore.

5. The hydraulic directional valve according to claim 3, wherein said sealing comprises at least two recessive portions arranged at a distance from said openings, said recessive portions are facing the lateral surface of said rotating body.

6. The hydraulic directional valve according to claim 1, wherein the valve body comprises a recess and said sealing comprises a lip received by said recess for preventing the sealing from rotating.

7. The hydraulic directional valve according to of claim 1, wherein the at least one means of the rotating body for receiving fluid flowing through the fluid passages comprises at least one notch.

8. The hydraulic directional valve according to claim 1, further comprising
a fitting integrally formed with the valve body, said fitting having at least three fluid conduits, each of which being connected to one of the at least three fluid passages of the valve body, and a threaded countersink connected to the cylindrical bore in which the rotating body is free to rotate, and
a threaded nut comprising a through hole for receiving said rotating body, said threaded nut being engageable with said threaded countersink.

9. The hydraulic directional valve according to claim 1, wherein a stem is connected to the rotating body and extends outside said valve body for operating said valve.

10. A method for providing a hydraulic directional valve, comprising the steps of:
providing a valve body having a cylindrical bore and at least three fluid passages connected to the cylindrical bore and providing a fluid channel to outside the valve body,
arranging a threaded countersink connected to the cylindrical bore,
arranging at least one sealing inside said cylindrical bore, said sealing having an outer surface parallel with the axis of the cylindrical bore and defining at least three openings, and a tapered inner surface, each of the at least three openings being aligned with a passage of the at least three fluid passages,
providing a rotating body inside said cylindrical bore, the lateral surface of the rotating body having a frusto-conical shape corresponding to the inner surface of the sealing, said rotating body defining at least one notch, the at least one notch sized to overlap two openings at a time of the at least three openings at a first rotational position of the rotating body within the cylindrical bore, the at least one notch further sized such that the notch overlaps only one opening of the at least three openings at a second rotational position of the rotating body within the cylindrical bore, and
sealing said fluid system by means of a threaded nut engageable with said threaded countersink, said nut comprising a through hole for receiving said stem, wherein the rotating body is pressed downwards when the nut is tightened.

11. The hydraulic directional valve according to claim 1, wherein the at least one means for allowing fluid flow comprises at least one notch extending inwardly from an outer surface of the rotating body and sized to simultaneously be in fluid communication with two adjacent passages of the at least three passages at one or more first rotational positions of the rotating body within the cylindrical bore, the at least one notch further sized such that the notch is in fluid communication with only one of the at least three passages at one or more second rotational positions of the rotating body within the cylindrical bore.

12. The hydraulic directional valve according to claim 11, wherein the sealing defines at least three openings, the notch sized to overlap two adjacent openings of the at least three openings in the first rotational positions.

* * * * *